(12) United States Patent
Renninger et al.

(10) Patent No.: US 9,008,133 B2
(45) Date of Patent: Apr. 14, 2015

(54) GIANT-CHIRP OSCILLATOR FOR USE IN FIBER PULSE AMPLIFICATION SYSTEM

(75) Inventors: William Henry Renninger, Ithaca, NY (US); Frank W. Wise, Ithaca, NY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 13/128,754

(22) PCT Filed: Nov. 12, 2009

(86) PCT No.: PCT/US2009/064277
§ 371 (c)(1),
(2), (4) Date: Sep. 23, 2011

(87) PCT Pub. No.: WO2010/056920
PCT Pub. Date: May 20, 2010

(65) Prior Publication Data
US 2012/0033690 A1    Feb. 9, 2012

Related U.S. Application Data

(60) Provisional application No. 61/113,696, filed on Nov. 12, 2008.

(51) Int. Cl.
*H01S 3/30* (2006.01)
*H01S 3/067* (2006.01)
*H01S 3/11* (2006.01)
*H01S 3/16* (2006.01)

(52) U.S. Cl.
CPC .............. *H01S 3/067* (2013.01); *H01S 3/1112* (2013.01); *H01S 3/1115* (2013.01); *H01S 3/1618* (2013.01)

(58) Field of Classification Search
USPC .......................................... 372/6, 94
See application file for complete search history.

(56) References Cited

U.S. PATENT DOCUMENTS

| 5,590,143 | A  | * | 12/1996 | Takara et al. | 372/28 |
| 2004/0052276 | A1 | * | 3/2004 | Lou et al. | 372/6 |
| 2006/0056480 | A1 | * | 3/2006 | Mielke et al. | 372/94 |
| 2006/0291521 | A1 | * | 12/2006 | Ilday et al. | 372/94 |
| 2008/0117940 | A1 | * | 5/2008 | Tang et al. | 372/6 |
| 2010/0045974 | A1 | * | 2/2010 | Kaertner et al. | 356/218 |

FOREIGN PATENT DOCUMENTS

| WO | WO 2006113507 A2 | * | 10/2006 | H04J 14/06 |
| WO | WO 2008105833 A2 | * | 9/2008 | H01S 3/067 |

OTHER PUBLICATIONS

A. Chong, J. Buckley, W. Renninger, and F. Wise, "All-normal-dispersion femtosecond fiber laser," Opt. Express 14, 10,095-10,100 (2006).

A. Chong, W. H. Renninger, and F. W. Wise, "Properties of normal-dispersion femtosecond fiber lasers," J. Opt. Soc. Am. B 25(2), 140-148 (2008).

(Continued)

*Primary Examiner* — Yuanda Zhang
(74) *Attorney, Agent, or Firm* — Perkins Coie LLP

(57) ABSTRACT

A normal-dispersion fiber laser is operated using parameters in which dissipative solitons exist with remarkably large pulse duration and chirp, along with large pulse energy. A low-repetition-rate oscillator that generates pulses with large and linear chirp can thus replace the standard oscillator, stretcher, pulse-picker and preamplifier in a chirped-pulse fiber amplifier.

32 Claims, 3 Drawing Sheets

(56) References Cited

OTHER PUBLICATIONS

W. H. Renninger, A. Chong, and F. W. Wise, "Dissipative solitons in normal-dispersion fiber lasers," Physical Review A (Atomic, Molecular, and Optical Physics), 77(2), 023814 (pp. 4) (2008).

A. Chong, W. H. Renninger, and F. W. Wise, "All-normal-dispersion femtosecond fiber laser with pulse energy above 20nJ," Opt. Lett. 32, 2408-2410 (2007).

* cited by examiner

# GIANT-CHIRP OSCILLATOR FOR USE IN FIBER PULSE AMPLIFICATION SYSTEM

GOVERNMENT SPONSORSHIP STATEMENT

The work on this invention was supported by the National Science Foundation under Grant No. ECS-0701680 and the National Institutes of Health under Grant No. EB002019. The Government has certain rights in the invention.

BACKGROUND OF THE INVENTION

1. Field of the Invention

The present invention relates in general to a short-pulse amplification technique which employs a laser oscillator that generates pulses with much larger chirps than in known fiber oscillators to reduce the complexity of the overall system design.

2. Description of the Background Art

The generation of femtosecond pulses with energies above 1 µJ from a practical fiber source requires one or more stages of amplification. To avoid excessive nonlinear phase accumulation in the amplifiers, large-mode-area fibers are employed along with chirped-pulse amplification (CPA). A typical fiber CPA system consists of an oscillator, a stretcher, one or more preamplifiers, a large-mode amplifier, and a pulse-picker to optimize the use of the available power and to lower the repetition rate to that appropriate for a given application. Much progress has been made in fiber CPA systems, but to date they have barely begun to supplant solid-state instruments in applications despite their major potential advantages. There is clear motivation to simplify the systems to better exploit the benefits of fiber, particularly greater integration and lower cost.

More particularly, known short-pulse fiber amplifiers employ a low energy, short-pulse, and high repetition-rate oscillator, the output of which must be substantially modified before the pulse can be amplified to a useful energy level. First, the stretcher is employed to stretch the output pulse form the oscillator to greater than 100 ps duration. This stretching is necessary to avoid deleterious nonlinear phase accumulation in the later amplification stages, and the pulse energy is kept low to avoid nonlinear phase shifts in the stretcher. The pulse picker is then used to cut the repetition rate to obtain more energy per pulse for a given average amplifier power, which is limited by available pump power. The modified pulse is then amplified and finally compressed back to close to the transform-limited duration (e.g. on the order of hundreds of femtoseconds). Several pre-amplification stages are generally needed to reach the desired overall gain, which can be as high as $10^7$. The use of a low power oscillator, a pulse stretcher, a lossy and costly pulse picker and several stages of amplification represent costly and inefficient disadvantages to the otherwise desirable CPA based systems. A need clearly exists for a more cost efficient design of a CPA system.

SUMMARY OF THE INVENTION

The present invention addresses the foregoing need through provision of a CPA based pulse amplification system that only requires an oscillator, one or more amplifiers and a compressor. This is accomplished through use of a new mode of operation of a fiber oscillator, marked by large pulse energies, large pulse durations and giant pulse chirp. Because of the giant chirp, no stretcher external to the oscillator is needed, as the effect of nonlinear phase accumulation will be small. As a consequence, the energy of the oscillator can be high and can take the place of a stage of pre-amplification. Finally, the oscillator can be designed at very low repetition rates (e.g. less than 10 MHz), thereby erasing the need for a lossy and expensive pulse-picker.

The key to the oscillator design is that the characteristics of the oscillator components, including the length of a single mode fiber (SMF) and the bandwidth of a spectral filter in the oscillator cavity, are selected so that the oscillator has an inherently lower repetition rate and imparts more than 10 $ps^2$ of group-velocity dispersion to the generated pulses. This results in a chirping of the pulse that is on the order of one or two magnitudes greater than the chirp normally imparted to pulses in previous fiber oscillators. Thus, the phrase "giant chirp" is employed here to describe this key characteristic of the resulting oscillator output pulses. Typically, the high energy giant chirped output pulse will have a duration of 100 ps or more, which eliminates the need for an external pulse stretcher and thus allows the use of increased power levels in the oscillator. The giant chirped pulses can readily be dechirped with any suitable compressor back down to hundreds of femtoseconds (e.g. on the order of 1 ps or less). The result is a short pulse with high energy, achieved without the use of external pulse stretchers and pickers, and with less need for multiple stages of amplification.

BRIEF DESCRIPTION OF THE DRAWINGS

The features and advantages of the present invention will become apparent from the following detailed description of a preferred embodiment thereof, taken in conjunction with the accompanying drawings which are briefly described as follows.

FIG. 4a shows the oscillator spectrum; FIG. 4b shows the oscillator pulse measured by a detector with 50 ps resolution (the additional signal on the right of the pulse is due to capacitive ringing from the cable); FIG. 4c, solid curve, shows the amplified spectrum; dotted curve, amplified spontaneous emission spectrum; and, FIG. 4d shows the autocorrelation of amplified and dechirped pulse. The pulse duration assuming a deconvolution factor of 1.5 is shown. The trace is asymmetric because the pulse duration is close to the limit of delay in the autocorrelator.

FIG. 5a shows the oscillator spectrum; FIG. 5b shows the oscillator pulse; FIG. 5c shows the amplified spectrum; and, FIG. 5d shows the intensity autocorrelation of amplified and dechirped pulse, which is too long for interferometric measurement.

DETAILED DESCRIPTION OF THE INVENTION

Figure 1:
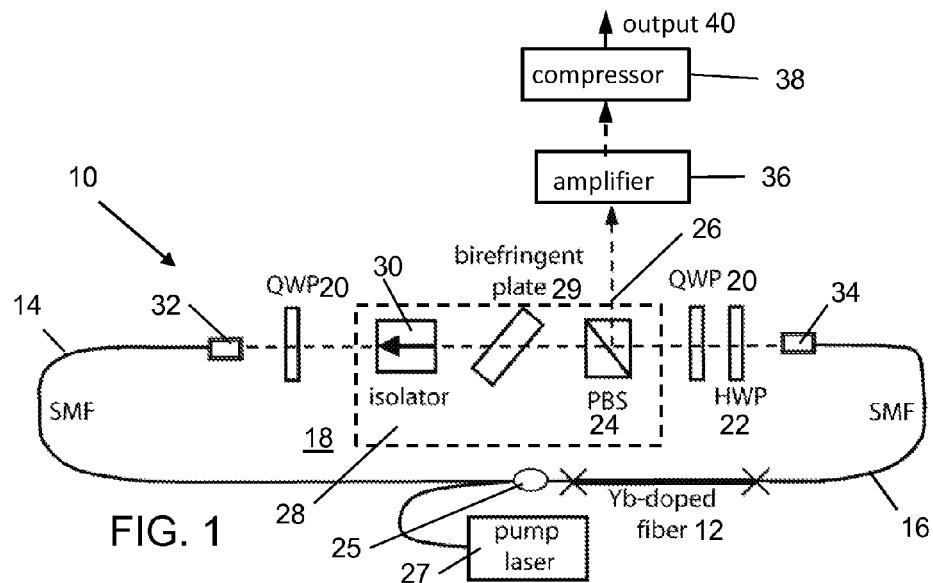
FIG. 1 is a schematic illustration of a chirped pulse amplifier system which incorporates a giant chirp oscillator (GCO) constructed in accordance with a preferred embodiment of the present invention.

As noted previously, the major new component of the fiber amplifier system is the oscillator. The details of a first preferred embodiment will first be discussed followed by a discussion of possible variations. A schematic of a fiber oscillator 10 constructed in accordance with a first preferred embodiment of the invention is shown in FIG. 1. The oscillator 10 includes a Yb-doped gain fiber 12, which emits at a wavelength of 1030 nm. It should be noted that many different doping concentrations would suffice for this setup. The oscillator design is conceptually similar to the all-normal-dispersion laser described previously in for example, Published International Application WO 2008/105833, which was published on Sep. 4, 2008 and is entitled All-Normal-Dispersion Femtosecond Fiber Laser. However, the fiber segments in the present invention tend to be much longer than in the '833 application and other prior work, to achieve the desired low repetition rate and to introduce normal group-velocity dispersion (GVD) needed to optimize the pulse formation. More particularly, a long (e.g. greater than 10 meters) segment of single-mode fiber (SMF) 14 precedes the gain fiber 12, and a short segment of SMF 16 follows the gain fiber 12 in a unidirectional ring cavity 18. All components of the laser oscillator 10 have normal GVD.

Also disposed in the ring cavity 18 are first and second quarter-waveplates (QWP) 20; a half-waveplate (HWP) 22; a polarizing beam-splitter (PBS) 24; and a wavelength-division multiplexer (WDM) 25. The QWPs 20 and HWP 22 are standard optical elements used to control the state of the polarization which in turn controls nonlinear polarization evolution (NPE), which starts the solution from noise and plays a major role in pulse formation. More particularly, the wave plates 20 and 22 and polarizing beam splitter 24 function as a fast saturable absorber which controls NPE. These NPE controlling components can be replaced with several other types of suitable saturable absorbers, such as a SESAM (semiconductor saturable absorber mirror) or a CNT (carbon nanotube absorber). The PBS 24 is also a standard optical component and serves three purposes. First, it is crucial to have a polarizer for NPE to function, and second, the PBS 24 also serves as an output coupler to generate an output 26 because the beam is split at this point. The pump laser 27 is a 980 single mode pump diode, which is coupled into the gain fiber with the 980/1030 WDM 25.

The PBS 24 also serves as part of a crucial component for this mode of operation, which is a spectral filter 28. The spectral filter 28 is formed from the combination of a birefringent plate 29, an isolator 30 and the PBS 24, which both act as polarizers. The birefringent plate 29 is preferably a standard birefringent piece of quartz. It must be placed between two polarizers, in this case the isolator 30 and the PBS 24, in order to operate as a sinusoidal spectral filter. The bandwidth of the filter is proportional to the thickness of the birefringent plate 29. The birefringent plate 29 is turned at an angle (usually Brewster's angle) to minimize transmission loss. In addition to serving as a polarizer, the optical isolator 30 insures that the light can only propagate in one direction. Without the isolator 30, starting the laser can be very difficult.

Attached to the two ends of the SMF fibers 14 and 16, are first and second 1030 collimators 32 and 34, respectively, which output a beam with 1 mm diameter. This parameter can vary. Regarding the lengths of the SMF fibers 14 and 16, the SMF 16 to the right of the gain fiber 12 should be short (0-1 m) to minimize nonlinearity. The gain fiber 12 should be only long enough to absorb all of the pump power (typically 50 cm-1 m). The SMF fiber 14 to the left of the gain fiber 12 should be long for proper operation of the GCO (>10 m). This long fiber is the main differentiating ingredient for the GCO, the key difference being that it provides a large amount of normal GVD in the cavity, allowing for pulse solutions with large quadratic spectral phase (e.g. greater than 10 ps$^2$).

The GCO 10 forms part of a CPA system 35. The giant chirped output pulses from the oscillator 10 are fed through an amplifier 36 and then through a compressor 38, which compresses the amplified pulses back down to about 1 ps or less in duration. The compressed pulses are then emitted by the CPA system 35 through an output 40. It should be noted that the amplifier 36 can actually be formed from a number of pre-amplifiers and/or amplifiers.

Analysis, realistic numerical simulations and actual experiments were conducted to confirm the behavior and performance of these fiber lasers that operate in a new regime, characterized by the generation of pulses with chirp one to two orders of magnitude larger than can be achieved with existing mode-locked lasers. The pulses, which are dissipative solitons, can be dechirped to near the transform limit. Stable chirped pulses with large energies can be generated at low repetition rates. A GCO may therefore eliminate the stretcher, pulse-picker, and one or more pre-amplifier stages from a conventional fiber CPA system. A system operating at a 3-MHz repetition rate has been experimentally demonstrated, with initial results that reach microjoule pulse energies and sub-picosecond pulse durations.

The fiber laser of FIG. 1 generates pulses, which are dissipative solitary waves of the cubic-quintic Ginzburg-Landau equation (CQGLE) that governs pulse propagation in the cavity. This analytical formalism can be extended to the GCO mode-locking regime. The nondimensionalized CQGLE, $$U_z = gU + \left(1 - i\frac{D\Omega}{2}\right)U_{tt} + \left(\frac{\alpha}{\gamma} + i\right)|U|^2 U + \frac{\delta}{\gamma^2}|U|^4 U, \quad (1)$$

where D is the GVD, g is the net gain and loss, $\Omega$ is the filter bandwidth squared, $\alpha$ is a cubic saturable absorber term, $\delta$ is a quintic saturable absorber term, $\gamma$ refers to the cubic refractive nonlinearity of the medium, U is the product of the electric field envelope and $\sqrt{\gamma}$, z is the propagation coordinate and t is the product of the local time and $\sqrt{\Omega}$, admits the following exact solution:

$$U = \sqrt{\frac{A}{\cosh(t/\tau) + B}} e^{-i(\beta/2)\ln(\cosh(t/\tau)+B)+i\theta z}. \quad (2)$$

Figure 2:
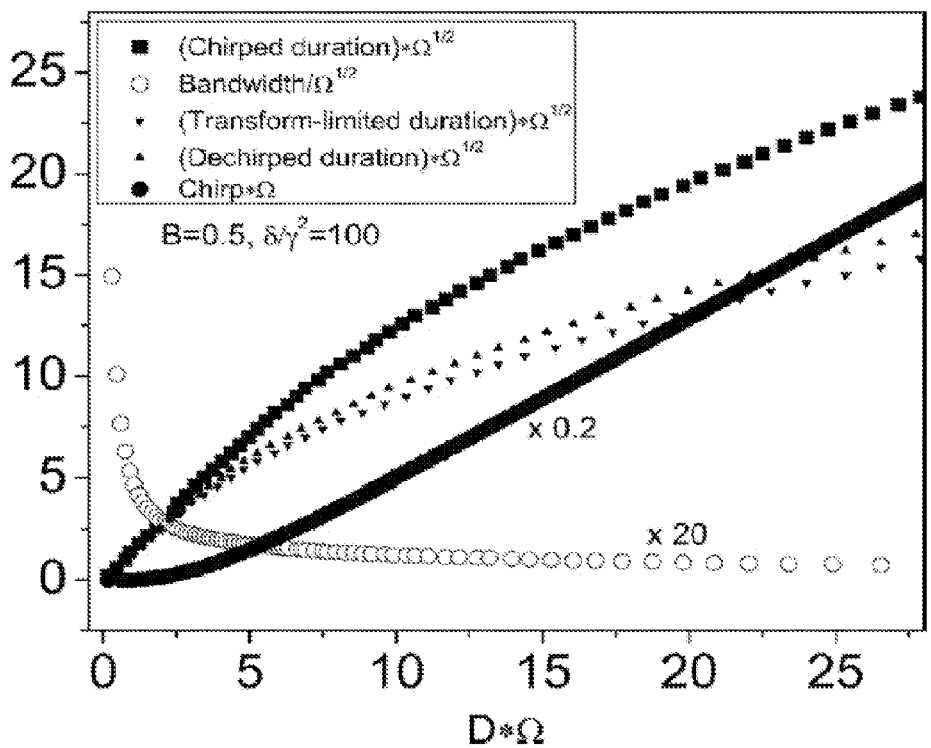
FIG. 2 is a graph showing the variation of a number of exact solution normalized pulse parameters as a function of normalized dispersion.

The variation of Eq. 2 with GVD (see the graph of FIG. 2) illustrates the features that are most important here. $\alpha/\gamma$ and g are constrained for the exact solution to satisfy Eq. 1. As the cavity dispersion increases, the pulse duration and the chirp (which is positive) increase along with the pulse energy. The bandwidth (dechirped pulse duration) decreases (increases) slowly, and the dechirped pulse duration begins to deviate from the transform-limited value. These trends show that the GCO operation is a natural extension of the pulse evolution in known fiber oscillators. The GCO produces pulses with large quantitative differences from previous oscillators as a result of the intricate balance of the nonlinear and linear processes in the system, given by the CQGLE, an intuitive explanation of which will be the subject of future investigation. An interesting feature of dissipative solitons is that the chirp (again see FIG. 2) can be larger than the GVD of the cavity, meaning that the spectral phase is partially created by the nonlinearity of the system.

To verify and refine the analytical results, numerical simulations of the oscillator were also performed. The simulations include the appropriate terms of the CQGLE with saturating gain, $g=g_o/(1+E_{pulse}/E_{sat})$, where $g_o$ corresponds to 30 dB of small-signal gain, $$E_{pulse} = \int_{-T_R/2}^{T_R/2} |A|^2 dt,$$

where A is the electric field envelope, $T_R$ is the cavity round trip time and $E_{sat}$=10 nJ. A 62-m segment of SMF precedes 40 cm of Yb-doped gain fiber, and a 50-cm segment follows it, with $\beta_2$=230 fs$^2$/cm and $\gamma$=0.0047 (Wm)$^{-1}$. The fiber is followed by a monotonic saturable absorber given by $T=1-l_o/[1+P(\tau)/P_{sat}]$ where $l_o$=0.7 is the unsaturated loss, $P(\tau)$ is the instantaneous pulse power and $P_{sat}$=0.5 kW is the saturation power. The gain is assumed to have a gaussian spectral profile with a 60 nm bandwidth, the output coupling is 88%, and a gaussian filter with 10 nm bandwidth is placed after the saturable absorber. The 30 nJ output pulse is 70 ps long (FIG. 3), and it can be dechirped to 800 fs with 10 ps$^2$ of anomalous GVD. The numerical results confirm a feature that will be important for applications: with increasing chirp, the dechirped pulse duration deviates from the transform limited value. For chirp values relevant to microjoule-energy CPA, the deviation is a factor of 2-3. A residual quartic spectral phase underlies the deviation.

Figures 3A, 3B:
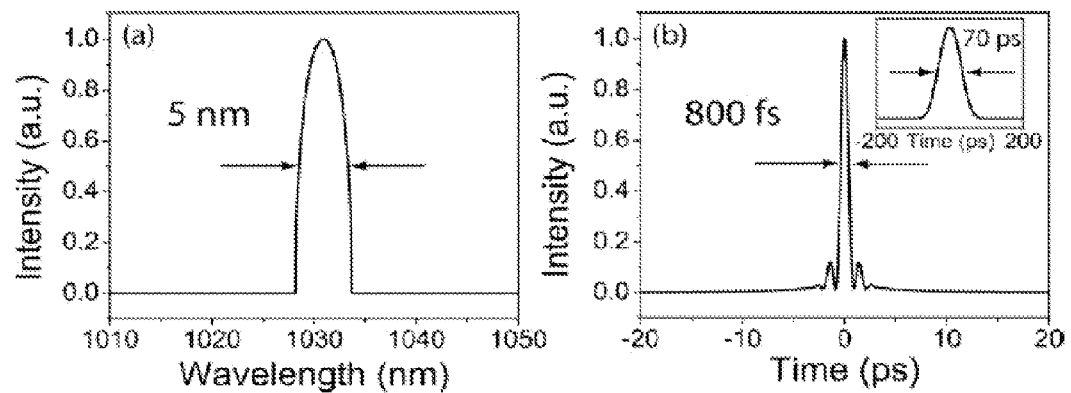
FIGS. 3a and 3b are graphs showing simulation of a GCO with realistic parameters with FIG. 3a showing the oscillator spectrum and FIG. 3b showing the dechirped pulse (with the chirped pulse shown in the inset).

A laser was constructed with all-normal-dispersion elements but with a much longer segment of SMF, as in the simulation of FIG. 3, to obtain a net GVD of 1.4 ps$^2$. A birefringent filter with 10-nm bandwidth was chosen for the experiments presented here. The 3.2-MHz repetition rate would be difficult to achieve with a soliton laser designed to generate sub-picosecond pulses, owing to the resonant instability that limits the cavity length to several times the soliton period. Different operating states of the laser are accessed via adjustments to the wave plates and the pump power, corresponding to adjustments of $\gamma$, $\alpha$ and g in Eq. 1. Here we will focus on two specific modes, which highlight the capabilities and flexibility of the laser even with fixed fiber and filter parameters. The first mode illustrates the typical parameters that are possible, and the other demonstrates larger effective chirp on a narrower-bandwidth pulse.

Figures 4A, 4B:
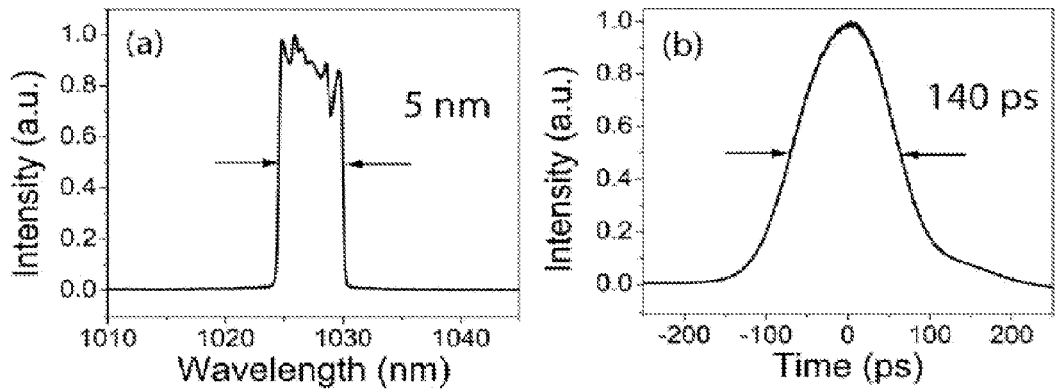
FIGS. 4a-4d are graphs illustrating results obtained in experiments on a GCO constructed in accordance with the preferred embodiment and operated in the long chirped pulse mode.
Figures 4C, 4D:
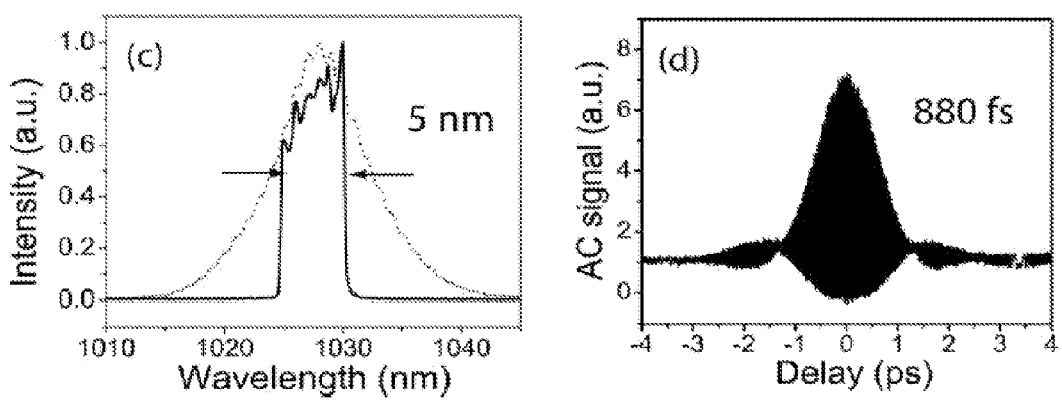

To assess the utility of the laser for seeding amplifiers, a setup was employed with an SMF preamplifier pumped in-core by a single-mode diode, a large-mode-area ($\approx$1000 $\mu$m$^2$) photonic crystal fiber (PCF) main amplifier pumped with as much as 25 W, and a grating compressor. In CPA it is generally desirable to stretch the pulse to the longest duration that can be recompressed, and fiber versions commonly stretch the seed pulse to hundreds of picoseconds. The longest pulses generated by this GCO are shown in FIG. 4. The steep-sided spectrum (FIG. 4a) is characteristic of the normal-dispersion pulse solutions. The spectrum implies a transform-limited pulse duration of $\approx$500 fs, so the 140-ps duration (FIG. 4b) is $\approx$300 times the transform limit. The transform-limited pulse would require the dispersion of $\approx$500 m of fiber ($\approx$10 ps$^2$) to reach the measured duration. The oscillator is pumped with only 190 mW, and the output power is 50 mW, for a pulse energy of 15 nJ. For the given amplifier fiber, the pulse is long enough to avoid nonlinear distortion for pulse energies up to $\approx$10 $\mu$J. The pulse is amplified to 67 nJ in the preamplifier and to 1.3 $\mu$J in the amplifier (4.3-W average power, limited by the available pump power). The spectrum is unchanged by the amplification (FIG. 4c), except for some asymmetry that seems likely to result from seeding the amplifier at wavelengths below the peak of the gain. The amplified pulses can be dechirped to 880-fs duration (FIG. 4d) by gratings that supply 11 ps$^2$ of anomalous GVD. The amplified pulse duration is thus within a factor of 2 of the transform limit. Dechirped pulse durations as short as 670 fs are also observed with this setup.

Figure 5A:
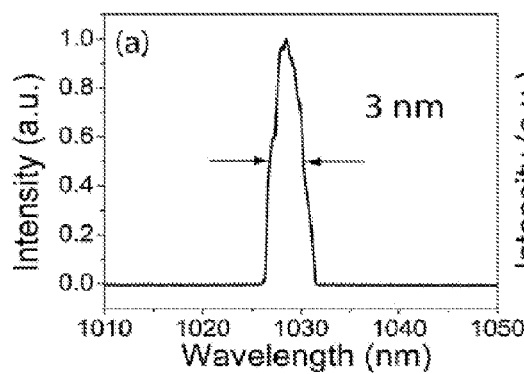
FIGS. 5a-5d are graphs showing the narrow-bandwidth mode.
Figure 5B:
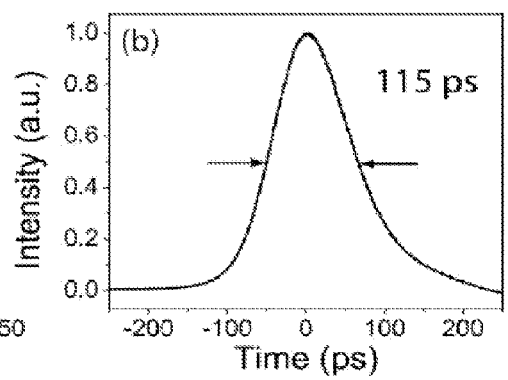
Figure 5C:
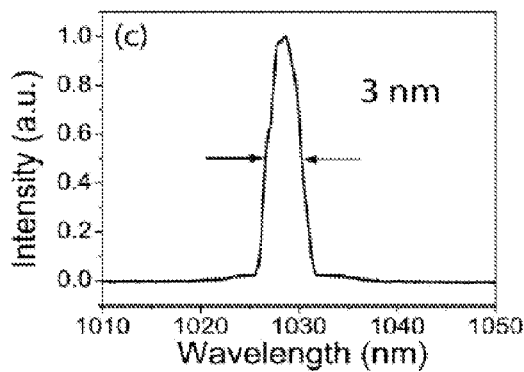
Figure 5D:
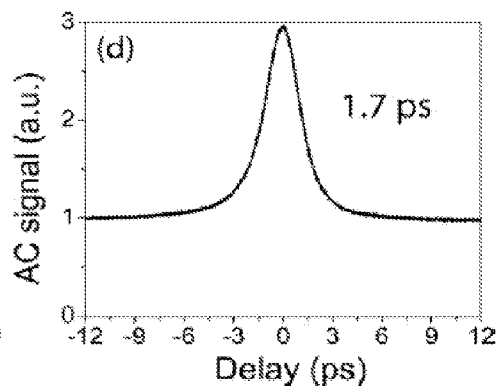

CPA becomes more difficult to implement as the pulse duration increases, owing to the increased dispersion needed to stretch narrow-bandwidth pulses. The pulse spectrum shown in FIG. 5 has a transform-limited duration of 0.6 ps. The 115-ps pulse from the GCO (FIGS. 5a and 5b) corresponds to impressing 19 ps$^2$ of GVD on the transform-limited pulse. This value corresponds to the GVD of 1 km of fiber, which is already a challenge to compensate with a grating pair with reasonable spacing. The 2-nJ pulse (90 mW pump) from the GCO is amplified to 1.2 $\mu$J and dechirped to 1.7-ps duration (FIGS. 5c and 5d). These examples demonstrate good initial performance, and clearly illustrate the practical benefits of the GCO. Systems that reached these performance levels previously required a stretcher, pulse-picker, and additional pre-amplifier. It should be emphasized that the experiments presented here are not intended to represent the performance limits of this approach. They were performed with standard, off-the-shelf fibers and components available in the inventors' laboratory. It will be possible to extend the GCO regime in several directions, based on the trends of FIG. 2. For example, at lower repetition rates, the pulse duration and chirp can be much larger, and this will be valuable for the highest-energy fiber CPA systems. The longer chirped pulse comes at the expense of a modest sacrifice in the final pulse duration and the deviation from transform limit. A broader range of pulse parameters will be available with GCOs designed with different fiber parameters, which are available for operation at 1.5 $\mu$m, e.g., or with custom fiber.

A number of alternative versions of the invention are possible. The invention applies to any repetition rate with appropriate filter bandwidth. Any wavelength where the cavity has large net normal dispersion (e.g. 1550 nm with added normal dispersion fiber). Any saturable absorber can replace the three waveplate/polarizer combination. For example, a saturable absorbing mirror (SESAM) or a carbon nanotube absorber (CNT) can be employed. In these cases it would be much preferable to use polarization maintaining fiber because one can then avoid solution drift. Any filter implementation is possible, such as for example, an interference filter. It is even possible to use no filter, but with loss of performance. The cavity can be in ring, linear or sigma configurations. Any pumping configuration is also possible including single clad, double clad, etc.

Useful criteria in designing a GCO include the following. First, the giant chirped output pulses from the GCO 10 require greater than 10 ps$^2$ of anomalous GVD to be dechirped in the compressor. As far as the saturable absorber, any suitable type including an NPE, SESAM or CNT should work. The type of oscillator cavity is also not limited to a ring and can include linear or sigma. Regardless of what types of components are selected, the GCO design process is the same. First, the desired repetition rate is selected. The repetition rate determines the required fiber length and the fiber length determines net GVD. Given this GVD, determine the appropriate filter to achieve the required chirp. If the chirp is too high, decrease the filter bandwidth. If the chirp is too low, increase the filter bandwidth. Less GVD requires larger filters for the same chirp. For example, a 3 MHz repetition rate requires ~60 m of fiber which provides a total GVD of 1.4 ps². Using a 10 nm filter results in 11 ps² of spectral phase as in the discussion above.

In summary, the subject invention defines a new operating regime of dissipative soliton lasers, which features long and highly-chirped pulses. In addition to their scientific importance as solutions of a mode-locked laser, these pulses are attractive for femtosecond and picosecond fiber amplifiers. The combination of long pulse duration, low repetition rate, and relatively high pulse energy is unique, and allows the removal of the stretcher, pulse-picker, and one or more pre-amplifiers from previous CPA designs. It is expected that these lasers will enable practical fiber amplifiers with performance well beyond the microjoule level attained in initial experiments.

Although the invention has been disclosed in terms of a preferred embodiment and variations thereon, it will be understood that numerous other modifications and variations could be made without departing from the scope of the invention as defined in the following claims.

The invention claimed is:

1. A laser oscillator for generating giant chirped pulses comprising:
    a laser cavity that contains all-normal-dispersion elements inside to exhibit a normal group velocity dispersion at each location of the laser cavity;
    a gain fiber in said cavity for increasing the energy of a pulse in said cavity;
    a normal group velocity dispersion chirping element for broadening the duration of a pulse in said cavity and thereby forming a chirped pulse;
    a spectral filter in said laser cavity for filtering a spectral part of said chirped pulse; and
    an output for emitting said chirped pulse from said cavity;
    wherein said normal group velocity dispersion chirping element and said spectral filter have characteristics which are selected to impart an amount of chirp such that more than 10 ps² of anomalous dispersion is required to dechirp said chirped pulse.

2. The laser oscillator of claim 1, wherein said normal group velocity dispersion chirping element comprises a length of single mode fiber and wherein the characteristics of said chirping element and said spectral filter which are selected to impart an amount of chirp such that more than 10 ps² of anomalous dispersion is required to dechirp said chirped pulse comprise the length of said single mode fiber and a bandwidth of said spectral filter.

3. The laser oscillator of claim 2, wherein the length of said single mode fiber is at least 10 meters.

4. The laser oscillator of claim 1, wherein the chirped pulses generated by said oscillator have a repetition rate of less than 10 MHz.

5. A chirped pulse amplifier system employing the laser oscillator of claim 1 and further including at least one amplifier for amplifying said chirped output pulse from said oscillator and a pulse compressing element for dechirping said amplified pulse.

6. The chirped pulse amplifier system of claim 5, wherein said pulse compressing element reduces the duration of said pulse by at least 1 order of magnitude.

7. The laser oscillator of claim 1, wherein the spectral filter is configured to have a filter bandwidth that decreases when a desired chirp in the chirped pulse output from the laser cavity is to be decreased, and increases when the desired chirp in the chirped pulse output from the laser cavity is to be increased.

8. The laser oscillator of claim 1, wherein:
    the laser cavity is a ring laser cavity to direct the chirped pulse along only one direction in the ring laser cavity from the spectral filter, to the normal group velocity dispersion chirping element and to the gain fiber.

9. The laser oscillator of claim 8, wherein
    the normal group velocity dispersion chirping element includes a long segment of single mode fiber coupled between the spectral filter and the gain fiber to have a sufficiently long length to achieve a desired low pulse repetition rate in the ring laser cavity and to introduce a normal group velocity dispersion that optimizes formation of the chirped pulse.

10. The laser oscillator of claim 8, wherein:
    the ring laser cavity further includes a short segment of single mode fiber between the gain fiber and the output of the ring laser cavity that has a sufficiently short length to reduce optical nonlinearity in the chirped pulse caused by the short segment of single mode fiber.

11. A method for generating giant chirped pulses in a cavity of a laser oscillator comprising the steps of:
    including in said cavity all-normal-dispersion elements inside to exhibit a normal group velocity dispersion at each location of an optical path inside said cavity;
    providing a plurality of pulse shaping elements in said cavity, said pulse shaping elements at least including a gain fiber for increasing the energy of a pulse, a normal group velocity dispersion chirping element for broadening the duration of a pulse and a spectral filter for filtering a spectral bandwidth of a pulse; wherein said pulse shaping elements have characteristics which are selected to impart an amount of chirp to a pulse such that more than 10 ps² of anomalous dispersion is required to dechirp said pulse;
    passing a pulse through said pulse shaping elements, thereby forming a giant chirped pulse;
    configuring the spectral filter to include a birefringent piece between two polarizers and have a filter bandwidth that decreases when a chirp in the giant chirped pulse output from the laser cavity is to be decreased, and increases when the chirp in the giant chirped pulse output from the laser cavity is to be increased; and
    emitting said giant chirped pulse through an output of said laser oscillator by directing the output via one of the polarizers in the spectral filter.

12. The method of claim 11, wherein said chirping element is a length of single mode fiber, and the characteristics of said single mode fiber and said spectral filter which are selected to impart an amount of chirp such that more than 10 ps² of anomalous dispersion is required to dechirp said chirped pulse comprise the length of said single mode fiber and a bandwidth of said spectral filter.

13. The method of claim 11, further comprising the steps of amplifying said chirped output pulse from said laser oscillator with at least one amplifier; and, dechirping said pulse.

14. The method of claim 13, wherein said dechirping step reduces the duration of said pulse by at least one order of magnitude.

15. The method of claim 11, wherein the chirped pulses generated by said oscillator have a repetition rate of less than 10 MHz.

16. The method of claim 11, comprising:
    configuring the cavity as a ring cavity to direct the chirped pulse along only one direction in the ring cavity from the spectral filter, to the normal group velocity dispersion chirping element, to the gain fiber and to the output of the cavity.

17. The method of claim 16, comprising:
configuring the normal group velocity dispersion chirping element to include a long segment of single mode fiber to have a sufficiently long length to achieve a desired low pulse repetition rate in the ring cavity and to introduce a normal group velocity dispersion that optimizes formation of the giant chirped pulse.

18. A laser oscillator for generating giant chirped pulses comprising:
a laser cavity that contains all-normal-dispersion elements inside to exhibit a normal group velocity dispersion at each location of said cavity;
a gain fiber in said cavity for increasing the energy of a pulse in said cavity;
a normal group velocity dispersion chirping element for broadening the duration of a pulse in said cavity and thereby forming a chirped pulse, said chirping element comprising a length of at least 10 meters of single mode fiber;
a spectral filter in said laser cavity for filtering a spectral content of said chirped pulse, the spectral filter including a birefringent piece between an optical isolator and a polarizer, and
an output for emitting said chirped pulse from said cavity by directing the output via the polarizer in the spectral filter;
wherein said spectral filter is selected to have a bandwidth which substantially increases the amount of chirp imparted to said pulse over the amount of chirp that would be imparted by the single mode fiber alone such that a substantially increased amount of anomalous dispersion is required to dechirp said chirped pulse, and
wherein said spectral filter bandwith and said length of said single mode fiber are selected to impart an amount of chirp such that more than 10 $ps^2$ of anomalous dispersion is required to dechirp said chirped pulse.

19. The laser oscillator of claim 18, wherein the chirped pulses generated by said oscillator have a repetition rate of less than 10 MHz.

20. A chirped pulse amplifier system employing the laser oscillator of claim 18 and further including at least one amplifier for amplifying said chirped output pulse from said oscillator and a pulse compressing element for dechirping said amplified pulse.

21. The chirped pulse amplifier system of claim 20, wherein said pulse compressing element reduces the duration of said pulse by at least 1 order of magnitude.

22. The laser oscillator of claim 18, wherein the spectral filter is configured to have a filter bandwidth that decreases with a decrease in a desired chirp in the chirped pulse output from the laser cavity, and increases with an increase in the desired chirp in the chirped pulse output from the laser cavity.

23. The laser oscillator of claim 18, wherein:
the laser cavity is a ring laser cavity to direct the chirped pulse along only one direction in the ring laser cavity from the spectral filter, to the normal group velocity dispersion chirping element and to the gain fiber.

24. The laser oscillator of claim 23, wherein
the normal group velocity dispersion chirping element includes a long segment of single mode fiber coupled between the spectral filter and the gain fiber to have a sufficiently long length to achieve a desired low pulse repetition rate in the ring laser cavity and to introduce a normal group velocity dispersion that optimizes formation of the chirped pulse.

25. The laser oscillator of claim 23, wherein:
the ring laser cavity further includes a short segment of single mode fiber between the gain fiber and the output of the ring laser cavity that has a sufficiently short length to reduce optical nonlinearity in the chirped pulse caused by the short segment of single mode fiber.

26. A method for generating giant chirped pulses in a cavity of a laser oscillator comprising the steps of:
including in said cavity all-normal-dispersion elements inside to exhibit a normal group velocity dispersion at each location of an optical path inside said cavity;
providing a plurality of pulse shaping elements in said cavity, said pulse shaping elements at least including a gain fiber for increasing the energy of a pulse; a normal group velocity dispersion chirping element for broadening the duration of a pulse comprising a length of at least 10 meters of single mode fiber; and a spectral filter including a birefringent piece between two polarizers and having a bandwidth that is selected such that a substantially increased amount of chirp is imparted to a pulse over the amount of chirp that would be imparted by the single mode fiber alone; such that a substantial amount of anomalous dispersion is required to dechirp said pulse;
passing a pulse through said pulse shaping elements, thereby forming a giant chirped pulse;
emitting said giant chirped pulse through an output of said laser oscillator by directing the output via one of the polarizers in the spectral filter; and
selecting said pulse shaping elements to impart an amount of chirp such that more than 10 $ps^2$ of anomalous dispersion is required to dechirp said chirped pulse at said output of said laser oscillator.

27. The method of claim 26, further comprising the steps of amplifying said chirped output pulse from said laser oscillator with at least one amplifier; and, dechirping said pulse.

28. The method of claim 27, wherein said dechirping step reduces the duration of said pulse by at least one order of magnitude.

29. The method of claim 26, wherein the chirped pulses generated by said oscillator have a repetition rate of less than 10 MHz.

30. The method of claim 26, further comprising:
configuring the spectral filter to have a filter bandwidth that decreases when a desired chirp in the giant chirped pulse output from the cavity is to be decreased, and increases when the desired chirp in the giant chirped pulse output from the cavity is to be increased.

31. The method of claim 26, comprising:
configuring the cavity as a ring cavity to direct the chirped pulse along only one direction in the ring cavity from the spectral filter, to the normal group velocity dispersion chirping element, to the gain fiber and to the output of the cavity.

32. The method of claim 31, comprising:
configuring the normal group velocity dispersion chirping element to include a long segment of single mode fiber to have a sufficiently long length to achieve a desired low pulse repetition rate in the ring cavity and to introduce a normal group velocity dispersion that optimizes formation of the giant chirped pulse.

* * * * *